Figure 1:
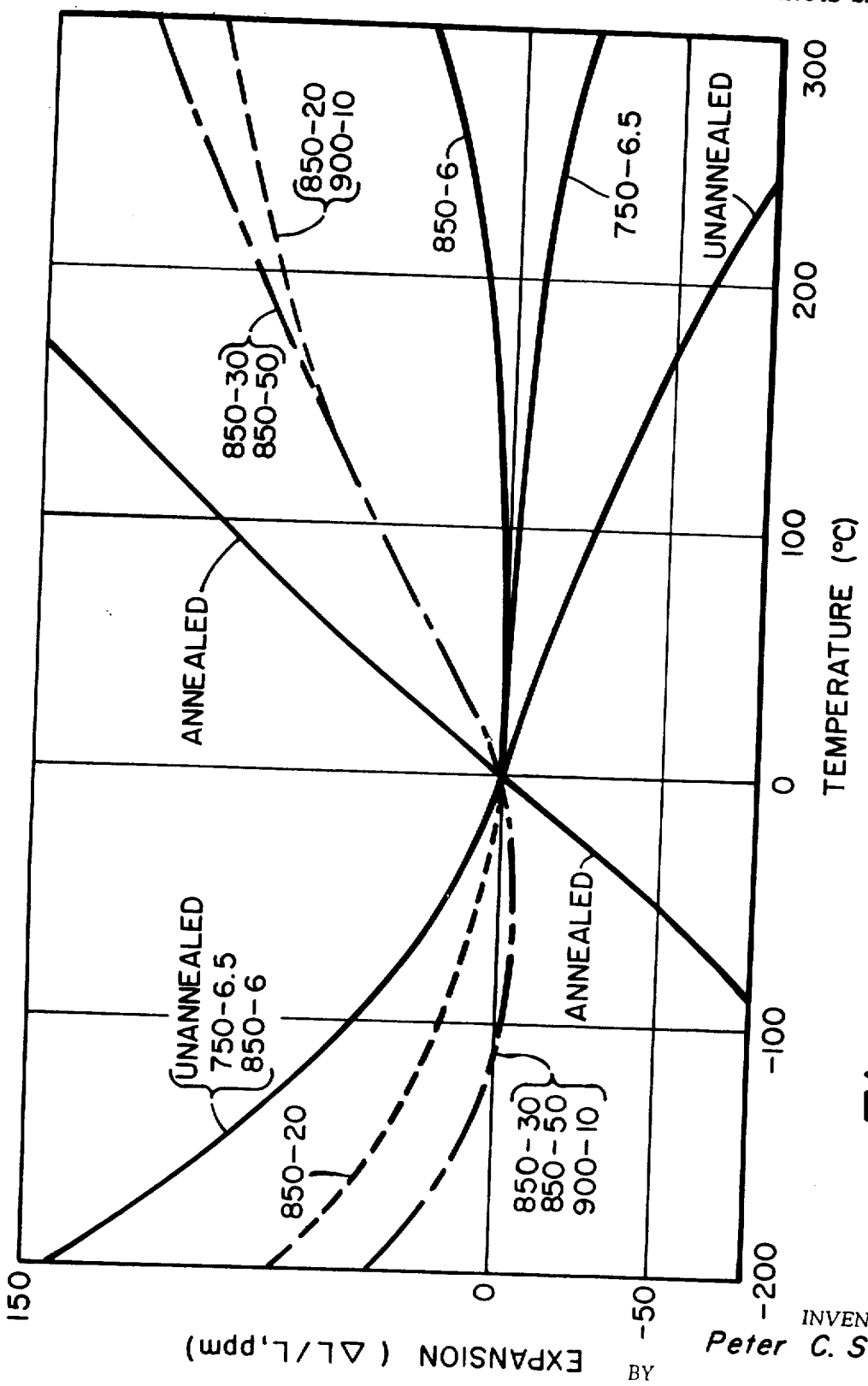

3,690,855
METHOD FOR PRODUCING TiO₂–SiO₂ GLASSES
Peter C. Schultz, Painted Post, N.Y., assignor to Corning Glass Works, Corning, N.Y.
Filed Aug. 19, 1970, Ser. No. 65,096
Int. Cl. C03c 3/04
U.S. Cl. 65—117                 3 Claims

ABSTRACT OF THE DISCLOSURE $TiO_2$–$SiO_2$ glasses containing 12–20% by weight $TiO_2$ are disclosed. These glasses may be heat treated to provide a controlled low or zero thermal coefficient of expansion over the range of $-200°$ C. to $+700°$ C.

---

The glass art has long recognized a need for glasses having a low coefficient of thermal expansion.

Originally, such glasses were needed primarily to provide resistance to heat shock. This is resistance to development of strain and fracture when sudden and non-uniform changes in temperature occur within a glass article such as a cooking vessel or a high temperature lamp envelope. In this respect, glasses essentially composed of $SiO_2$, in particular fused quartz and fused silica glasses, were recognized as the ultimate available in low expansion glasses. Such glasses have a coefficient of linear thermal expansion of about $5 \times 10^{-7}/°$ C. as measured over the range of 25–300° C. For comparison, ordinary window and container glasses have a coefficient of about $90 \times 10^{-7}$, and low expansion borosilicate glasses, developed for oven ware, have a coefficient of about $35 \times 10^{-7}$.

The coefficient of linear thermal expansion for a glass, or other materal, may be measured over any temperature range of interest. However, it has become customary in the glass art to employ the temperature range of 25°–300° C. When not otherwise stated then, this temperature range is implied.

Recently, increasing attention has been given to low expansion glasses for use in optical communication and measuring equipment, as well as precision supports such as telescope mirror blanks. For such purposes, it is frequently necessary that the expansion coefficient of the glass closely approximate zero over a given operating temperature range. This has necessitated a search for new materials since fused silica and fused quartz do not meet such requirements.

United States Pat. No. 2,326,059, granted Aug. 3, 1943, to Dr. M. E. Nordberg, describes a unique family of $TiO_2$–$SiO_2$ glasses whose compositions contain 5–11% $TiO_2$ in addition to silica. These glasses are described as having coefficients of thermal expansion that are less than silica and which may approximate zero. The patent states that the coefficient increases rapidly as the $TiO_2$ content is increased beyond 9%, and that the value becomes excessive in glasses containing more than about 11% $TiO_2$.

More recently, glass-ceramic materials, claimed to have a substantially zero expansion coefficient, have been described and made available commercially. Such materials are disclosed for example in United States Pat. 3,484,328 granted Dec. 16, 1969 to L. M. Austin et al.

Application of these previously known, zero expansion materials has been limited by the fact that their coefficients approximate zero only over a relatively short temperature range. Thus, the coefficient of a typical material may remain approximately zero over the temperature range of 0–100° C., but deviate rather rapidly both above and below this temperature range.

There is, therefore, a definite need for a material, in particular a transparent vitreous material, that will provide a very small, or substantially zero, thermal coefficient of expansion over a considerably broader temperature range. In particular, there is a need for a material that will provide an expansion coefficient approximating zero at temperatures above 100° C. For example, a material providing essentially zero expansion over a temperature range from 0 to 500° C. would be very useful in precision optical and support applications. Here, systems are maintained at elevated temperatures, or are heated and cooled over wide ranges, and essentially no change in dimensions can be tolerated.

The present invention provides a solution to this problem. It is based on my discovery of a family of $TiO_2$–$SiO_2$ binary glasses that consist essentially of 12–20% $TiO_2$ and the remainder $SiO_2$, and that have a unique characteristic not found in other glasses, particularly not in other glasses of the $TiO_2$–$SiO_2$ family.

This unique characteristic is the ability of such glasses to have their thermal coefficient of expansion markedly altered by heat treatment of the glass. These glasses are characterized by a substantial negative coefficient in the as-produced, or unannealed, state, and by a substantial positive coefficient after they are fully annealed. I have found that the coefficient of expansion for such a glass, within the range of $-200°$ C. to $+700°$ C., can be changed to any desired intermediate value by suitable heat treatment, preferably below the glass annealing temperature. The intermediate coefficient provided will vary with the degree and extent of the heat treatment.

Based on these discoveries, my invention is a binary glass consisting essentially of 12–20% by weight $TiO_2$ and the balance silica. Such glasses are characterized by coefficients of thermal expansion, as measured over the range of $-200°$ C. to $+700°$ C., that may be thermally adjusted to values intermediate the characteristic unannealed and annealed values for the glasses. The invention further resides in a method of adjusting the thermal coefficient of expansion of such a glass by heating the glass at a temperature of at least 700° C., but below its softening temperature, preferably below its annealing temperature, for a time sufficient to impart a desired increase in the expansion coefficient of the glass within the temperature range of $-200°$ C. to $+700°$ C.

The glasses of the invention may be produced by normal glass melting procedure, that is by mixing suitably proportioned batches of silica and titania and fusing the batch mixtures at temperatures on the order to 1900–2000° C. Alternatively, a soot technique, as described in the Nordberg patent, or a gelation technique, followed by fusion at a temperature on the order of 1450° C. or somewhat higher, may be employed. However, the glasses are highly refractory and it is difficult to insure that they are completely melted to a transparent state so that the subsequent heat treatment may be successfully applied.

Accordingly, I have found it particularly convenient to employ a modification of the mixed chloride technique described in detail in the Nordberg patent mentioned earlier. In this procedure, a mixture of $SiCl_4$ and $TiCl_4$ vapors, in proper proportions, is entrained within a suitable carrier gas. The vapor mixture is passed through a burner to convert the chlorides to the corresponding oxides by flame hydrolysis. These in turn melt and are deposited in vitreous form on a suitable mandrel or bait. In this manner, a substantial deposit of glass is built up in a form commonly known as a boule.

The boule is rapidly cooled to room temperature. In this unannealed condition, the glass has a substantial negative coefficient of expansion. If the glass is heated to its annealing temperature (960° C.) and then cooled at a suitable rate for annealing purposes, it is found that the temperature coefficient now has a substantial positive value. For example, a typical glass, 85 $SiO_2$–15 $TiO_2$, may have an expansion coefficient of $-5\times10^{-7}/°$ C. over the range of $-200°$ C. to $+700°$ C. in the unannealed state. After annealing by heat treatment at 960° C. for one hour and cooling at 2–3° C./hour, the glass has a coefficient of $+10\times10^{-7}/°$ C. over the same range.

In accordance with the present invention, the glass may be heat treated at a temperature of at least about 700° C., but below the softening temperature, to raise the coefficient of linear expansion in the $-200$ to $+700°$ C. range to a value intermediate the values that characterize the unannealed and the annealed states of glass. The degree of change will depend on the temperature selected for the heat treatment and the time.

In general, a greater increase may be achieved with either a higher treating temperature or with a longer period of time at a given temperature. Relatively short heat treatments on the order of minutes may be sufficient, above the glass annealing temperature, to impart a desired increase. However, it is quite difficult to reliably control the process at these short times and high temperatures. Therefore it is preferred to use treating temperatures below the glass annealing temperature where times on the order of an hour or longer are required. In general a time longer than 20 hours is impractical.

The invention is not limited to any particular theory, but may be explained in terms of the valence co-ordination of the titanium ion in the glass structure. Thus, it is known that the titanium ion may enter either a fourfold co-ordination or a sixfold co-ordination. The co-ordination number corresponds to the number of Ti–O bonds existing per titanium ion.

It is my belief that silica glasses containing up to about 20% $TiO_2$ normally contain the titanium ion in a fourfold co-ordination when they are completely melted to a transparent glassy state and rapidly cooled to room temperature. Higher contents of $TiO_2$ tend to produce an opaque material consisting of glass and $TiO_2$ crystals (Ti in sixfold co-ordination). It is my further belief that the titanium ion is in a fourfold co-ordination in a transparent glass containing less than 12% $TiO_2$, and that this co-ordination number is relatively stable. However, in the range of the present invention, that is glasses containing 12–20% $TiO_2$, I believe that the titanium ion is in a fourfold co-ordination state if the glass is rapidly cooled, but that there is a tendency to shift to a sixfold co-ordination during heat treatment. It is my belief that the change of the titanium ion from a fourfold to a sixfold co-ordination causes a marked increase in the expansion coefficient of the glass. Therefore, the increase in coefficient that occurs with heat treatment in accordance with the present invention represents a corresponding change in co-ordination number.

The invention is further illustrated with reference to the following compositions, presented in percent by weight on the oxide basis, of glasses within the invention:

TABLE 1

|  | A | B | C | D |
|---|---|---|---|---|
| $SiO_2$ | 86.8 | 85.0 | 83.7 | 80.6 |
| $TiO_2$ | 13.2 | 15.0 | 16.3 | 19.4 |

A suitable mixture of silicon and titanium chlorides was prepared corresponding to each of the above compositions. Oxygen was bubbled through each mixture to entrain the respective chloride vapors in suitable proportions. This vapor mixture was then passed through a high temperature burner to produce, by flame hydrolysis, a glass of corresponding oxide composition as shown in the table. In each case, a glass boule, approximately 6 inches in diameter and 1 inch in thickness, was built up on a rotating bait and subsequently removed and cooled.

The glass samples thus obtained were then subjected to a variety of measurements and treatments, in particular heat treatments, to study the effects on coefficient of expansion in accordance with the invention. These studies are hereafter illustratively described with reference to a glass corresponding to composition B, that is, a glass consisting of 15% $TiO_2$ and 85% $SiO_2$.

It will be understood that the precise coefficient values for a given heat treatment will vary somewhat with the glass composition. However, the general effect is common to all glasses within the scope of the invention. Therefore, one can easily determine the effect of a particular heat treating cycle on a particular glass from the description hereafter presented.

Before proceeding further, it might be noted that glasses containing over about 17% by weight $TiO_2$ tend to be somewhat opaque due to the formation of small anatase ($TiO_2$) crystals dispersed in the glass. Since the presence of these crystals increases the glass expansion, the upper limit of useful compositions is about 20% by weight, and it is preferred to employ glasses containing not over 17% $TiO_2$. All of the glasses containing less than 17% $TiO_2$ have a blue-to-light brown tint which remains unaffected during heat treatment, even with relatively long heat treatments near the annealing point. While colored, the glasses are quite transparent.

Figure 2:
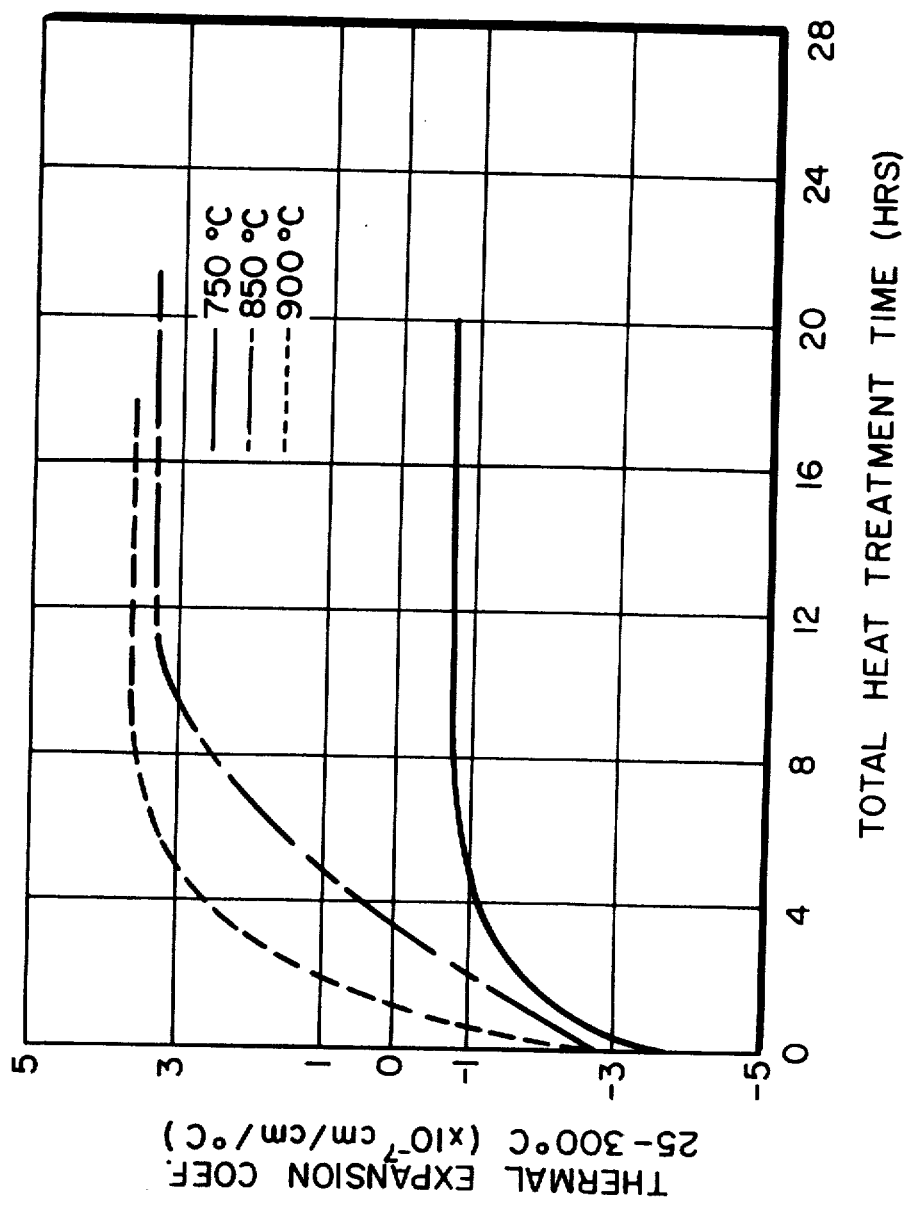
Figure 3:
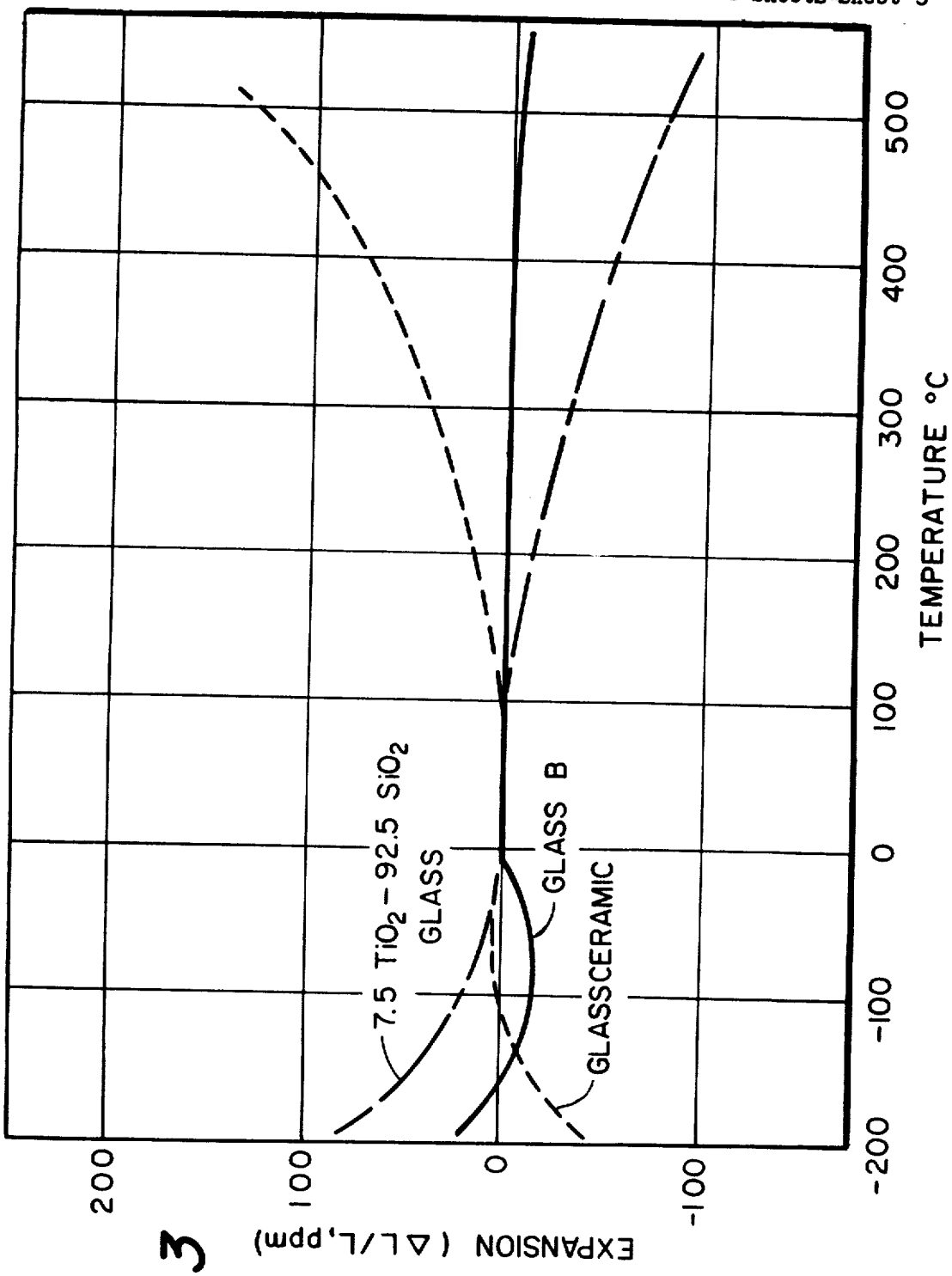

The heat treatment and comparative studies carried out on glass B are described with reference to the accompanying drawing wherein, FIG. 1 shows a series of curves in which glass expansion is plotted against temperature, FIG. 2 illustrates the effect of varying the heat treatment time at different temperature levels, and FIG. 3 compares glass B of the present invention with two previously known zero expansion coefficient materials.

FIG. 1 shows a series of thermal expansion curves. Each curve represents thermal expansion measurements ($\Delta L/L$ in parts per million) made on a separately treated sample of glass B over the temperature range of $-200°$ C. to $+300°$ C. The measurements were made on essentially identical samples of glass B, except that each sample was given a different predetermined heat treatment within the range of 750°–900° C. before making the expansion measurements. For comparison purposes, measurements were also made on an untreated sample and on an annealed sample. The annealing schedule consisted in heating to 960° C., holding at that temperature for one hour and cooling at 3° C./hour to 700° C. and then cooling by normal heat loss to room temperature.

The expansion curve measured on the untreated sample is indicated by the term "UNANNEALED," while that measured on the annealed sample is indicated by the term "ANNEALED." The remaining curves are numerically identified with reference to the heat treatment of the sample. The first number in the identification is the temperature in degrees centigrade of the heat treatment and the second number (the number following the dash) is the length of time in hours that the sample was held at that temperature.

It is apparent from FIG. 1 that the unannealed glass has a rather high negative coefficient between $-200°$ C. and $+700°$ C. As indicated by the data, the branch of the curve above 0° C. is shifted in a positive direction by heat treament, and finally provides a relatively high positive coefficient in the annealed state. Likewise, the branch of the curve below 0° C. is shifted in a negative direction, but obviously requires more intensive heat treatment for an appreciable effect. Thus, no appreciable deviation is noted below 0° C. for samples which were heat treated for six hours at either 750° or 850° C. In contrast, these same heat treatments changed the expansion characteristics above 0° C. so that a substantially zero coefficient was obtained in this region. Finally, it may be observed that the coefficient of thermal expansion corresponding to the "UNANNEALED" curve over the temperature range of $-200°$ C. to $+700°$ C. is $-5\times10^{-7}/$ °C., while the coefficient correspond to the "ANNEALED" curve is $+10 \times 10^{-7}/°C$.

It is apparent from FIG. 1 that essentially any desired intermediate expansion coefficient can be obtained over any given temperature range by suitable selection of heat treatment conditions. This may also be seen from FIG. 2 which represents numerous measurements of thermal expansion coefficient made on individual samples of glass B.

Essentially identical samples of the glass were prepared and divided into three groups. One group of samples was heat treated at 750° C. with a sample being removed from the heat treating furnace periodically at times ranging from 1 hour to 20 hours. Each of the other two sets was heat treated in similar manner, except that the temperature of heat treatment was 850° C. for one set and 900° C. for the third set. Thermal expansion coefficients over the range 25°–300° C. were measured for the heat treated glass samples, and the plotted data furnish the basis for the three curves shown in FIG. 2. Each curve represents thermal expansion coefficient values (vertical co-ordinate) as plotted against time in hours of heat treatment (horizontal co-ordinate) and temperature of heat treatment, as indicated by the numerical designation adjacent the curve.

It is apparent from this graphical illustration that any number of additional curves could be provided intermediate those shown and that any desired coefficient of expansion, within the indicated range, can be readily tailored into the glass by suitable choice of heat treatment. For example, a zero coefficient of thermal expansion over the range of 25°–300° C. may be achieved by either heat treating the glass at 850° C. for three hours or at 900° C. for one hour.

A sample of glass B was heat treated at 900° C. for one hour, and compared to a sample produced from a prior art glass containing 7.5% $TiO_2$ and 92.5% $SiO_2$, and to a sample of a commercially available glass-ceramic material claimed to have a zero coefficient of thermal expansion. Expansion measurements, as indicated in parts per million (p.p.m.) by the designation $\Delta L/L$, were made over the temperature range of −200° C. to +500° C. and plotted in FIG. 3. The expansion measurements are plotted on the vertical co-ordinate and temperature of measurement is plotted on the horizontal co-ordinate. Each curve is identified by the material which it represents. It is apparent that the previously available materials are suitable over a limited temperature range, but that only the materials of the present invention provide a substantially zero temperature coefficient over the entire measured temperature range.

The glass test sample of the present invention was subsequently subjected to heat treatment at 550° C. for a period of several days in order to determine temperature stability. No appreciable change in its expansion coefficient was noted, thus indicating a high degree of temperature stability for operating temperatures over the entire range.

While the invention has been described with respect to specific glasses and heat treatments, it will be evident that numerous variations and modifications are possible within the scope of the invention as defined in the following claims.

I claim:

1. In a method for making an article composed of glass consisting essentially, by weight on the oxide basis, of 12–20% $TiO_2$ and the balance $SiO_2$, wherein the glass has a coefficient of thermal expansion over the range of −200° C. to +700° C. with a negative value in the unannealed state and a positive value in the annealed state, the improvement which comprises heat treating said glass article in the unannealed state at a temperature between 700° C. and the softening point of the glass for a period of time sufficient to cause an increase in the coefficient of thermal expansion of the glass within the temperature range of −200° C. to +700° C.

2. A method according to claim 1 wherein said heat treating is carried out at a temperature between 700° C. and the annealing point of the glass.

3. A method according to claim 2 wherein the period of time sufficient to cause an increase in the coefficient of thermal expansion of the glass ranges between about 1–20 hours.

References Cited

UNITED STATES PATENTS

| | | | |
|---|---|---|---|
| 3,113,877 | 12/1963 | Janakirama-Rao | 106—52 |
| 2,326,059 | 8/1943 | Nordberg | 106—52 |

OTHER REFERENCES

De Vries, R. C. et al.: The System $TiO_2$-$SiO_2$, in Trans-Brit. Ceram. Soc., 53(9), 1954, pp. 525–540.

Kingery, W. D., Introduction to Ceramics, New York, 1960, pp. 473–476.

TOBIAS E. LEVOW, Primary Examiner

W. R. SATTERFIELD, Assistant Examiner

U.S. Cl. X.R.

65—33; 106—39 DX, 52